United States Patent [19]

Kadison et al.

[11] Patent Number: 4,494,156
[45] Date of Patent: Jan. 15, 1985

[54] SELECTABLE FORMAT COMPUTER DISK COPIER MACHINE

[75] Inventors: Eric M. Kadison; Subhash C. Batra, both of Mission Viejo; Gad E. Meir, San Jose, all of Calif.

[73] Assignee: Media Systems Technology, Irvine, Calif.

[21] Appl. No.: 378,484

[22] Filed: May 14, 1982

[51] Int. Cl.³ .................. G11B 5/09; G11B 5/86
[52] U.S. Cl. .................................. 360/48; 360/15
[58] Field of Search .............. 360/98, 15, 63, 48, 360/39

[56] References Cited

U.S. PATENT DOCUMENTS

| | | | |
|---|---|---|---|
| 4,240,120 | 12/1980 | Padwa | 360/15 |
| 4,270,154 | 5/1981 | Crawford | 360/98 |
| 4,375,055 | 3/1983 | Korth et al. | 360/15 |
| 4,380,047 | 4/1983 | Eisenbard | 360/15 |

FOREIGN PATENT DOCUMENTS 0051308 10/1981 European Pat. Off. .
0048781 4/1982 European Pat. Off. .

OTHER PUBLICATIONS

Product Description, "Stand Alone-Automatic Media Initialization Station," Applied Data Communications, Jan. 9, 1979, (2 pp.).
NEC uPD765 Single/Double Density Floppy Disk Controller, IC Master, 1980 Edition, United Technical Publications, New York, pp. 2333-2350.
Electronics, vol. 53, 24th Apr. 1980, p. 208, New York, USA, Bruce LeBoss: "Controller Handles Floppies, Fixed Disks", Figure; Columns 1,2.
Computer Design, vol. 21, No. 4, Apr. 1982, pp. 127-136, Winchester, MA; Doug Voight et al.: "Interfacing Intelligent Peripherals", pp. 127,128,130; FIGS. 1,2.
Computer Design, vol. 21, No. 4, Apr. 1982, pp. 103-111, Winchester, MA; Richard Brechtlein: "An Intelligent Interface for Disk/Tape Systems", pp. 105-106, Chapters: Controller/Formatter Hardware, Gigabyte Storage System, FIG. 2.
Electronic Design, vol. 28, No. 22, Oct. 1980, pp. 79-92, Rochelle Park, New Jersey: L. Yencharis: "Disk Drives Pack Answers", pp. 91-91, Chapter: Smarts for Floppy-Disk Controllers.

*Primary Examiner*—Vincent P. Canney
*Attorney, Agent, or Firm*—Knobbe, Martens, Olson and Bear

[57] ABSTRACT

A disk copier machine uses a host computer, disk controller, disk drive, and mechanical disk feeder in order to automatically copy information onto each of a number of disks. The selectable format computer disk controller is used in order to connect the host computer to the computer disk drive. The disk controller is constructed to receive format definition program steps from the host computer so that the controller may configure itself to accommodate the particular format of the disk in the computer disk drive. The controller contains standardized process control program steps which are executed inside the controller in order to interact with the particular format definition program provided by the host computer. The process control program is standardized to work with a large variety of disk formats and serves to control the execution of the format definition program, which is a particularized sequence of steps adapted to a particular disk format. The format definition program contains a format definition segment which serves to define the disk format, and an indirect addressing pointer table which is accessed by the process control program in order to control the use of the steps of the format definition segment. The selectable format disk controller is particularly useful for copying computer floppy diskettes so that the same disk copier machine may be used in order to copy disks having any of a variety of format types.

8 Claims, 16 Drawing Figures

FIG. 7

FORMAT DEFINITION PROGRAM

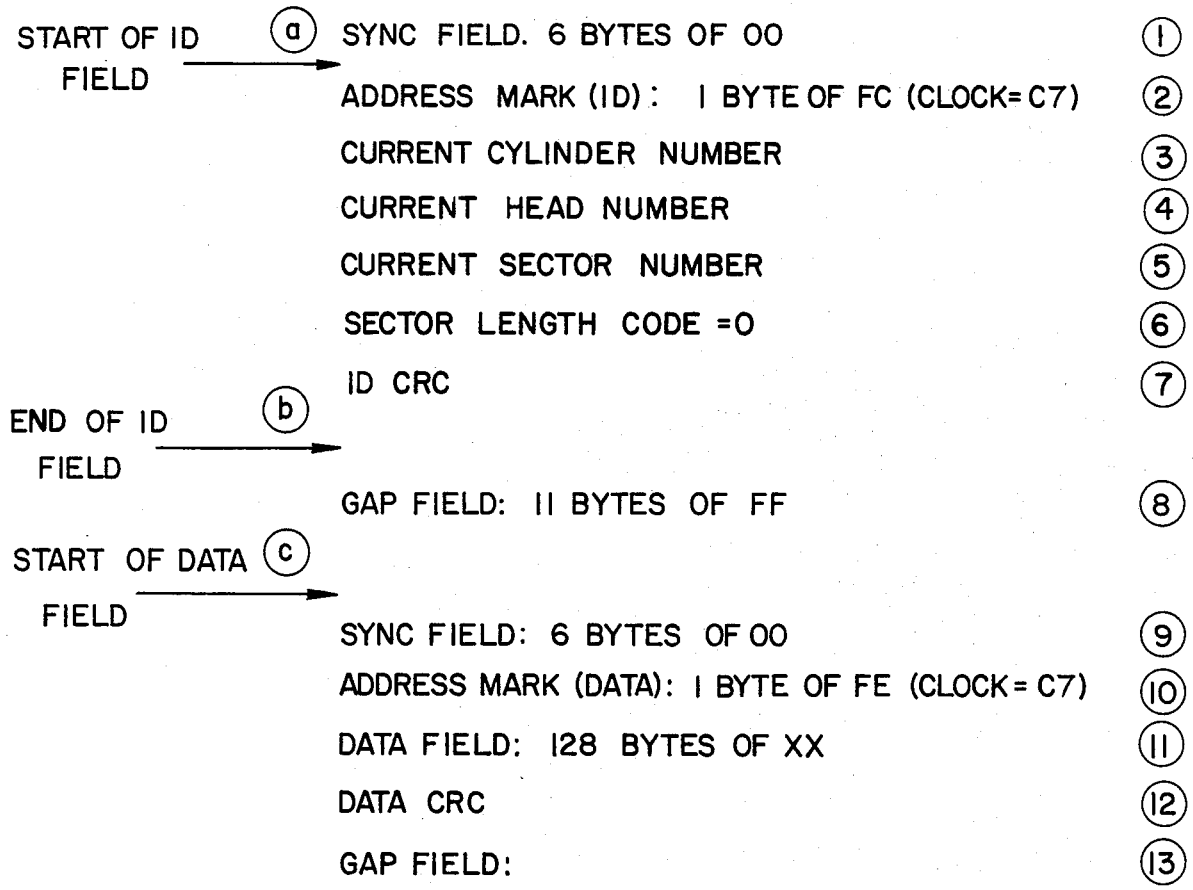

| | | |
|---|---|---|
| START OF ID FIELD (a) → | SYNC FIELD. 6 BYTES OF 00 | ① |
| | ADDRESS MARK (ID): 1 BYTE OF FC (CLOCK=C7) | ② |
| | CURRENT CYLINDER NUMBER | ③ |
| | CURRENT HEAD NUMBER | ④ |
| | CURRENT SECTOR NUMBER | ⑤ |
| | SECTOR LENGTH CODE =0 | ⑥ |
| END OF ID FIELD (b) → | ID CRC | ⑦ |
| | GAP FIELD: 11 BYTES OF FF | ⑧ |
| START OF DATA FIELD (c) → | SYNC FIELD: 6 BYTES OF 00 | ⑨ |
| | ADDRESS MARK (DATA): 1 BYTE OF FE (CLOCK=C7) | ⑩ |
| | DATA FIELD: 128 BYTES OF XX | ⑪ |
| | DATA CRC | ⑫ |
| | GAP FIELD: | ⑬ |

FORMAT DEFINITION LISTING

| ADDRESS | DATA | | | | | | | |
|---|---|---|---|---|---|---|---|---|
| 0000 | 20 | 32 | 21 | 3C | 60 | 40 | 00 | 00 |
| 0008 | 01 | 00 | 02 | 00 | 04 | 00 | A2 | 00 |
| 0010 | 20 | 34 | 21 | 3C | 60 | 43 | 20 | 3E |
| 0018 | A3 | 00 | 28 | 36 | C1 | 02 | 20 | 38 |
| 0020 | 22 | 3A | A1 | 00 | 00 | 00 | 00 | 00 |
| 0032 | 32 | FF | 0A | FF | 3B | FF | D5 | FF |
| 003A | 5D | FF | 05 | 00 | FE | E5 | 00 | 00 |
| 0040 | 00 | FE | C7 | 00 | FB | C7 | 00 | 00 |
| 0048 | 00 | 01 | 00 | 04 | 14 | 34 | 36 | 3C |
| 0050 | 00 | 04 | 08 | 00 | 01 | 00 | 00 | 59 |
| 0058 | 00 | 01 | 02 | 03 | 04 | 05 | 06 | 07 |
| 0060 | 08 | | | | | | | |

Fig. 15

SELECTABLE FORMAT COMPUTER DISK COPIER MACHINE

FIELD OF THE INVENTION

This invention relates generally to computerized control systems, and pertains more particularly to automatic disk copying machines and computer disk drive controllers having selectable formats for copying computer disks.

CROSS REFERENCE TO RELATED APPLICATION

The disclosure of a U.S. patent application Ser. No. 377,196, entitled "Automatic Floppy Disk Drive Loader" filed on May 11, 1982 listing James A. Norton as inventor, and assigned to the same assignee as the invention described herein, is incorporated herein by reference.

BACKGROUND

Floppy disks are digital data storage devices which may be used in computers in order to store large amounts of information. Each floppy disk includes a circular plastic sheet which is impregnated with magnetic particles and which has a central hub hole. The plastic disk is mounted inside a square jacket which encloses the disk, but which allows the circular plastic disk to rotate inside the jacket. The floppy disk may be mounted in a floppy computer disk drive which rotates the plastic disk inside the jacket and which has magnetic recording/reproducing heads for the reading or writing of digital data onto the floppy disk. The floppy disk may be provided with sector holes which are punched through the plastic disk in a circle surrounding the hub hole.

The digital data is stored on the floppy disk in a plurality of circumferential tracks or cylinders. Each track or cylinder is a complete circle and the tracks are arranged side-by-side along the radius of the plastic disk. The format of the floppy disk defines the use which is made (if any) of the sector holes, the type of data encoding modulation, the type of address marks used, and the physical arrangement of the digital data bytes along the length of each track. The format of some floppy disks is called "hard sectored" which indicates that punched sector holes are used in order to allocate the positions of data storage regions around each track on the floppy disk. If punched sector holes are not used, the floppy disk is referred to as having a "soft sectored" format in which the location of data on each track is determined by detecting the contents of the data stored on the track. Digital signals are stored on each track as a modulated mixture of a clock waveform and digital information bits. A variety of coding schemes are used for modulating the clock signals and the information bits for storage on the floppy disk. Three commonly used schemes are known as frequency modulation (FM), modified frequency modulation (MFM), and modified-modified frequency modulation (M2FM). The coding schemes differ in how closely information may be packed together into the disk track. Each track or cylinder on the floppy disk begins with preamble information bytes at the start of the track, a group of sectors arranged one after the other along the length of the track after the preamble, and postamble information at the end of the length of the track, after the sectors. The format of the floppy diskette defines the physical arrangement and meaning of digital bytes in each of the sectors of the track and in the preamble and postamble. For example, each sector typically has predefined areas allocated to synchronization characters, cylinder or track identification numbers, head numbers, and sector numbers. The format of the disk is also concerned with whether both sides of the disk are being used for data storage; i.e., whether the recording/reproducing heads on each side of the disk are being used.

Manufacturers of computer systems or floppy disk drives choose to use formats for floppy disk recordings which appear to be the most advantageous for the particular use to which the computer system or floppy disk drive is to be put. Because the number of manufacturers of computer floppy disk drives and computer systems is large, a large number of different formats of floppy disk drives have been used in the past. As described above, the format of a floppy disk refers to the usage of sector holes, the digital signal encoding scheme, the arrangement and meaning of information bytes stored in each track, and the use of one or two recording/reproducing magnetic heads.

The conventional design of a disk controller for use between a host computer and a floppy disk drive controller is adapted to operate with only a single format. With such a conventional design, floppy disks mounted in the disk drive which do not match with the particular format hard-wired into the controller may not be read from or written onto. Some disk controllers have been provided in the past which allow the host computer to specify to the controller the type of data encoding modulation scheme to be used, and which of the disk recording/reproducing magnetic heads to be used. However, prior controllers are quite inflexible in adapting to the particular arrangement of information bytes stored in each track. During the reading or writing operations from a computer disk drive, the disk controller must locate particular sectors along a track by detecting identification information coded in the bits stored in the track. The location and meaning of the identification bits in the track is dependent upon the particular format of the floppy disk in use. Therefore, prior controllers are generally unable to accommodate differing disk formats inasmuch as the arrangement of the important identification information is not the same for each format.

Prior disk initializer controllers have been made in which format definition program steps are provided by a host computer to random access memory in a controller which utilizes process control program steps in order to control the use of the format definition program. However, such initializer devices are used solely for the purpose of recording predefined identification information for each sector along each track of a diskette, and reading the identification information from the disk in order to verify that the identification information was properly recorded. Such prior initializer designs did not allow the reading or writing of data onto a disk and did not provide any way of copying information from one source disk to a destination disk. Prior initializer designs have used mechanical floppy disk loaders which feed a stack of floppy disks through a disk drive in order to initialize the disks, one after the other, in an automatic fashion. The prior initializer design included a very simplified controller which did not allow the diskette to be used in its intended fashion for the reading and writing of data. Thus the prior initializer controller lacked the capability of controlling a disk drive for copying diskettes, and was unable to place information on diskettes other than sector identification information. One example of a prior initializer design in which floppy diskettes were automatically fed into a disk drive for initialization is the MST model 800 initializer system product made by Media Systems Technology, Inc., the assignee of the invention described herein.

The prior technique most often used for the copying of floppy diskettes is to utilize a floppy disk controller which is hard-wired to accommodate the particular format of the floppy disk to be copied. In such an arrangement, a host computer is connected to a pair of disk drives through a pair of identical controllers so that the disk having the source of information is placed in the first disk drive, and the disk onto which the information is to be copied (the destination disk) is placed in the second disk drive. The host computer is used to transfer the data stored on the disk in the first disk drive to the disk in the second disk drive. Each of the two disk drive controllers ensure that the format for the disks is correct since each of the controllers is particularly adapted for the particular format in use. In such prior designs, disks are loaded manually, one at a time, into the disk drives.

SUMMARY OF THE INVENTION

The disk copier of this invention allows the automatic copying of digital data onto computer disks, so that a large number of disk copies may be made automatically. The disk copier has an automatic mechanical feeder which automatically feeds blank (initialized) floppy diskettes through a disk drive for copying. The disk copier also may be easily reconfigured through the use of format definition programs to accommodate various disk formats. The disk copier is constructed to be operated easily through an operator's control panel and uses a single source disk drive into which a format definition disk may be inserted to configure the copier, and into which a source disk may be inserted for copying from. The disk copier of this invention not only allows the reading, writing, and verifying of data but also allows disk initialization to be performed and the initialization performance to be verified.

The disk drive controller of this invention has a processor which is used for executing process control program steps stored in read only memory, which also uses format definition program steps stored in random access memory. The format definition program steps are provided to the random access memory by a host computer so that the disk drive controller configures itself to the particular format to be used in reading from or writing onto the disk in the disk drive. The process control program steps are standardized and fixed inside the disk controller and serve to control the use of the format definition program steps. The processor of the disk drive controller is constructed to respond to standardized commands (such as read, write or verify) from the host computer. The process control program is used by the controller processor in order to interpret the standardized commands received from the host computer, and in order to initiate use of the appropriate portions of the format definition program. Indirect addressing pointer tables may be provided in the format definition program steps so that the process control program may access particular format definition program steps by first referencing a pointer table entry.

In practice, the host computer establishes the disk format to be used by transferring an appropriate set of format definition program steps to the random access memory of the disk controller. After this transfer has been completed, the host computer may instruct the disk controller to perform certain operations (such as read, write, or verify) by transmitting standardized commands (which are format independent) to the disk drive controller.

The interaction between the fixed process control program and a format definition program inside the disk controller provides a large degree of flexibility for the controller in adapting to a variety of disk formats. This flexibility is highly advantageous in allowing the same disk drive and disk controller to be used in reading or writing operations from disks having a variety of formats. The fact that the format definition program steps are embodied in software which may be easily changed inside the disk controller and which may be applied to the disk controller by the host computer is very advantageous in allowing the format in use to be easily changed. The use of an indirect addressing pointer table inside the format definition program enhances the flexibility of the controller by allowing a large variety of arrangements and sequence of steps to be used in the format definition program.

The selectable format disk controller of this invention is particularly useful in the construction of machines for use in making copies of floppy computer diskettes. Such machines use a host computer connected through a controller to a source disk drive and further connected to one or more destination disk drives. The host computer is used initially in order to establish the disk format to be used by the source and destination disk drives. The controller may be configured by reading an appropriate format definition program into the host computer from a format definition disk mounted on the source disk drive. Once the format definition program has been read into the host computer, the disk controller is then configured by the host computer which transfers the format definition program to random access memory in the controller. The controller has then been properly configured for the appropriate disk format and the system may be used to produce copies by placing the source disk in the source disk drive and transferring the information from the source disk, through the host computer, to destination disk(s) in the destination disk drive(s). Preferably, an automatic mechanical floppy disk loader is used with the destination disk drive(s) so that a stack of floppy disks may be produced as copies, one after the other.

DESCRIPTION OF THE DRAWINGS

FIG. 7 shows a typical format definition program which corresponds to the arrangement of bytes shown in a sector in FIG. 4 and which also shows the positions of pointers inside the format definition program.

FIG. 15 form an object code listing of a typical format definition program for use in this invention.

DESCRIPTION OF THE PREFERRED EMBODIMENT

Figure 1:
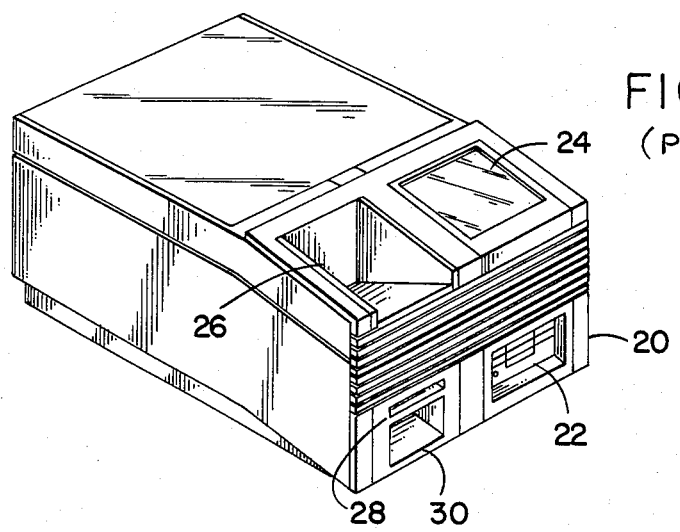
FIG. 1 is a perspective view of a desk top floppy disk copying machine.

Referring first to FIG. 1, the desk top floppy disk copier machine 20 includes a source disk drive 22 into which a source disk containing information which is to be copied may be placed. A user control panel 24 is the part of the copier machine 20 which allows a user to manually control the operation of the copier 20. A stack of blank diskettes may be placed in the hopper 26 of the copier 20 to be automatically fed into a destination disk drive (not shown) inside the copier machine 20 so that multiple copies of the source disk inside the disk drive 22 may be produced. The diskettes which pass from the hopper 26 and through the destination disk drive are deposited in either the "reject" bin 28 or "accept" bin 30. A selection is made inside the copier machine 20 for each disk to determine whether to place it in the bin 28 or bin 30 depending upon whether the copying operation inside the destination disk drive was verified to have been successful or unsuccessful.

Before the copying operation is begun using the copier machine 20, the particular format to be used for copying is defined by configuring the disk drive controller inside the copier machine 20. The configuration of the disk controller proceeds through the use of the user control panel 24 and the use of a format definition program stored on a floppy format definition disk. In order to configure the disk drive controller of the disk copying machine 20, the format definition disk is mounted in the source disk drive 22, and the appropriate operator entries are made on the user control panel 24 so that the format definition program is copied into the disk copying machine 20 from the format definition disk. The format definition disk is then removed from the source disk drive 22 and the disk copier 20 places a copy of the format definition program in the disk drive controller inside the copier 20. After these configuration steps have been performed, copier 20 is configured for operation with the particular format specified by the format definition program just read in. Because of the fact that the format definition program is provided in the form of software which may be read into the disk copier 20, the disk copier 20 may be used in order to make copies of a wide variety of different disk formats by loading the appropriate format definition program into the copier 20 for the particular disk format to be used.

The disk copier 20 is equipped with a mechanical automatic floppy disk loader which automatically feeds floppy diskettes (one at a time) from the hopper 26, through the destination disk drive, and into the bins 28 and 30.

An alternative arrangement for the copying of floppy computer diskettes may be provided using a device similar to the disk copier 20 but omitting the source disk drive 22, disk controller inside the copier 20, and the host computer inside the disk copier 20. Such a copier may include a standard microcomputer system wherein the central processor of that system and its floppy disk drive are substituted for the host computer, disk controller, and source disk drive 22 of the copier machine 20.

Another related type of floppy disk copying machine may be constructed in which a larger host computer is connected to a number of destination disk drives. The larger host computer would be equipped with a hard disk on which format definition programs and data to be copied would be stored. The disk drive controller used for each of the destination disk drives would be the same in construction as the disk controller described herein with reference to the desktop copier 20.

Figure 2:
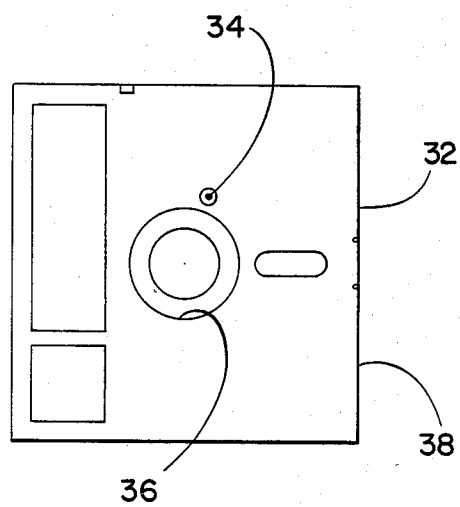
FIG. 2 is a top plan view of a floppy diskette.

Referring next to FIG. 2, a typical floppy computer disk 32 having a typical sector or index hole 34 is shown. The index hole 34 projects through a round, plastic, magnetic particle impregnated disk 36 which is mounted loosely for rotation inside a square jacket 38.

Figure 3:
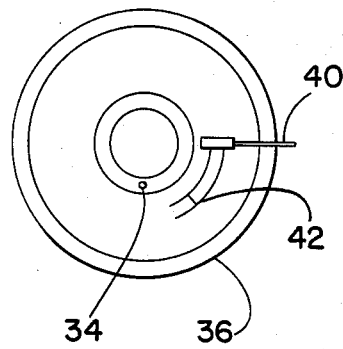
FIG. 3 is a diagramatic view showing the circular, plastic disk of a floppy diskette and showing a magnetic recording/reproducing head over the diskette. The cylinders or tracks on the diskette are shown as solid, circular lines.

Referring next to FIG. 3, the disk 36 is shown having a single index hole 34, but may have a plurality of sector holes arranged in a circle around the center of the disk 36. A magnetic recording/reproducing head 40 is shown in position over a track or cylinder 42 on the disk 36. As the disk 36 is spun about its center by the floppy disk drive, the magnetic recording/reproducing head 40 travels along the track 42 and may read and write electronic signals on the track 42. The cylinders or tracks on the surface of the disk 36 are circular in shape and arranged next to each other so that as the recording/reproducing head 40 is moved radially on the disk 36, the tracks are accessed sequentially.

Figure 4:
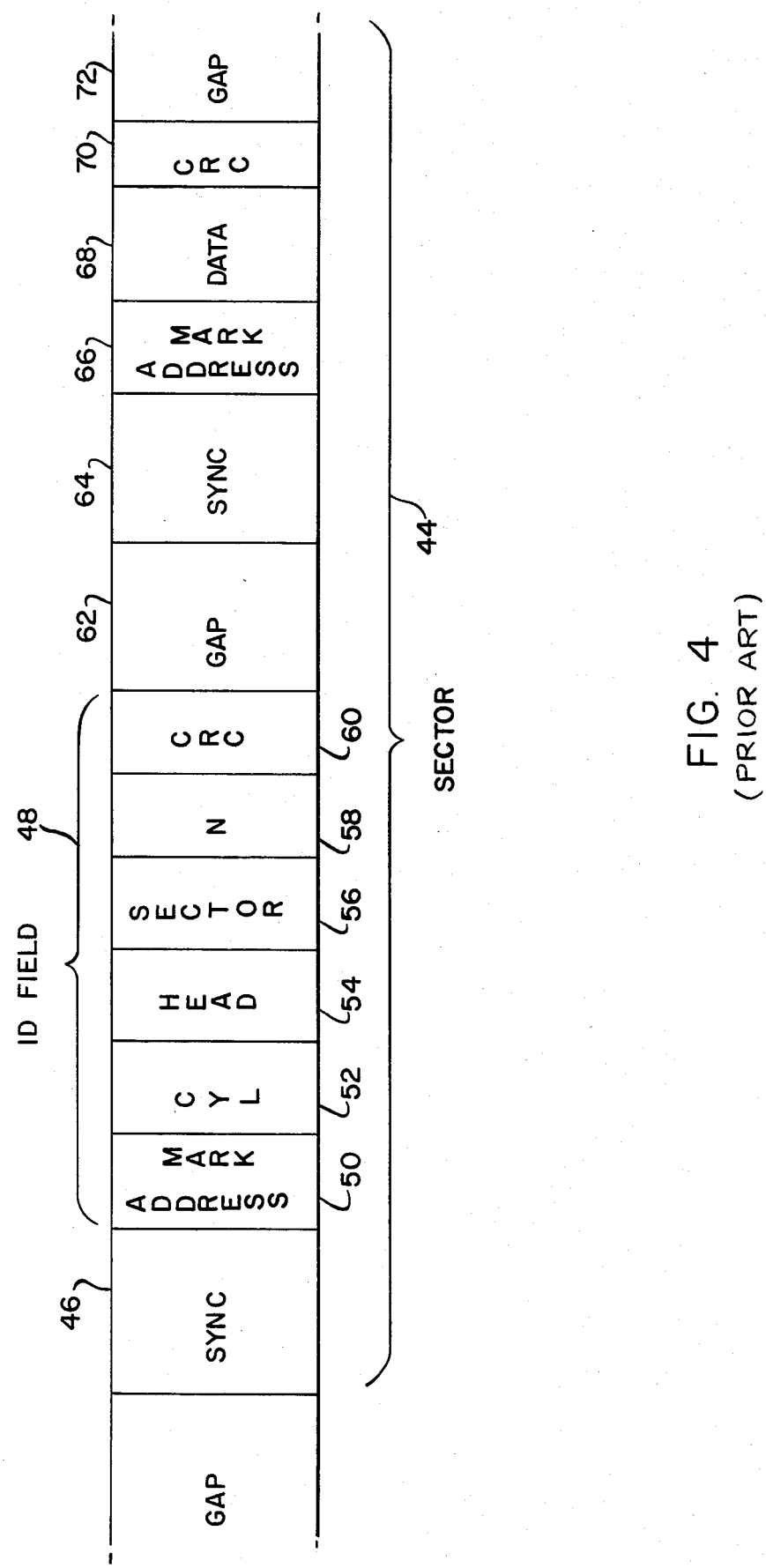
FIG. 4 is a diagram showing an example of the arrangement of information bytes for a sector on a track of a floppy diskette.

Referring next to FIG. 4, the sector 44 represents a portion of the digital information stored on a track of a floppy disk and corresponds to what is known as an IBM compatible format. The sector 44 starts out with a synchronization field 46 which contains clock signals allowing the disk drive controller to synchronize itself with the rate at which data is read from the disk. The synchronization field 46 is important because the data rate may vary due to the speed of operation of the disk drive and the conditions under which the floppy disk was originally recorded. After the synchronization field 46, an identification field 48 is provided which serves to identify the position of the sector 44 on the surface of the floppy disk 36 and acts as a reference guide in the reading or writing of data on the floppy disk. The identification field 48 includes a plurality of bytes relating to the address mark 50, cylinder number 52, head number 54, sector number 56, a sector length identifier "N" 58, and a cyclic redundancy check character 60. A gap 62 is placed after the identification field 48 in order to prevent overlapping of adjacent information stored inside the sector 44 due to varying conditions of operation (speed, etc.) of the disk drive. After the gap 62, a data synchronization field 64 is provided, followed by an address mark 66, a data field 68, a cyclic redundancy check character 70, and a gap 72.

The information shown in FIG. 4 displays the sequence of bytes of particular types of information stored inside the sector 44 and relates to the format used for recording the floppy disk. Although the particular arrangement and sequence of information shown in FIG. 4 is quite commonly used, a number of other types of sequences and arrangements are also in common use. The disk copying machine 20 may be configured in order to adapt itself to the making of copies in the format shown in FIG. 4 as well as in a variety of other formats.

The procedure normally used in the recording of floppy diskettes is to first initialize the diskette by recording each sector identification field for each sector in each of the tracks of the floppy diskettes. This process is referred to as initialization, and is commonly performed by the manufacturer of the floppy diskette. During a copying operation, the sectors are accessed one at a time by the disk controller so that the data appropriate to each sector may be placed in the data field 68. The disk controller ensures that the proper data goes into the proper sector by reading the identification field 48 to ensure that the cylinder number 52, head number 54, and sector number 56 are correct for the data to be placed in the data field 68. Typically, copying proceeds by transferring data from the data field 68 of the source disk to the data field 68 of the destination disk, provided that the identification field 48 for the two disks match up for the sector data to be transferred.

Figure 5:
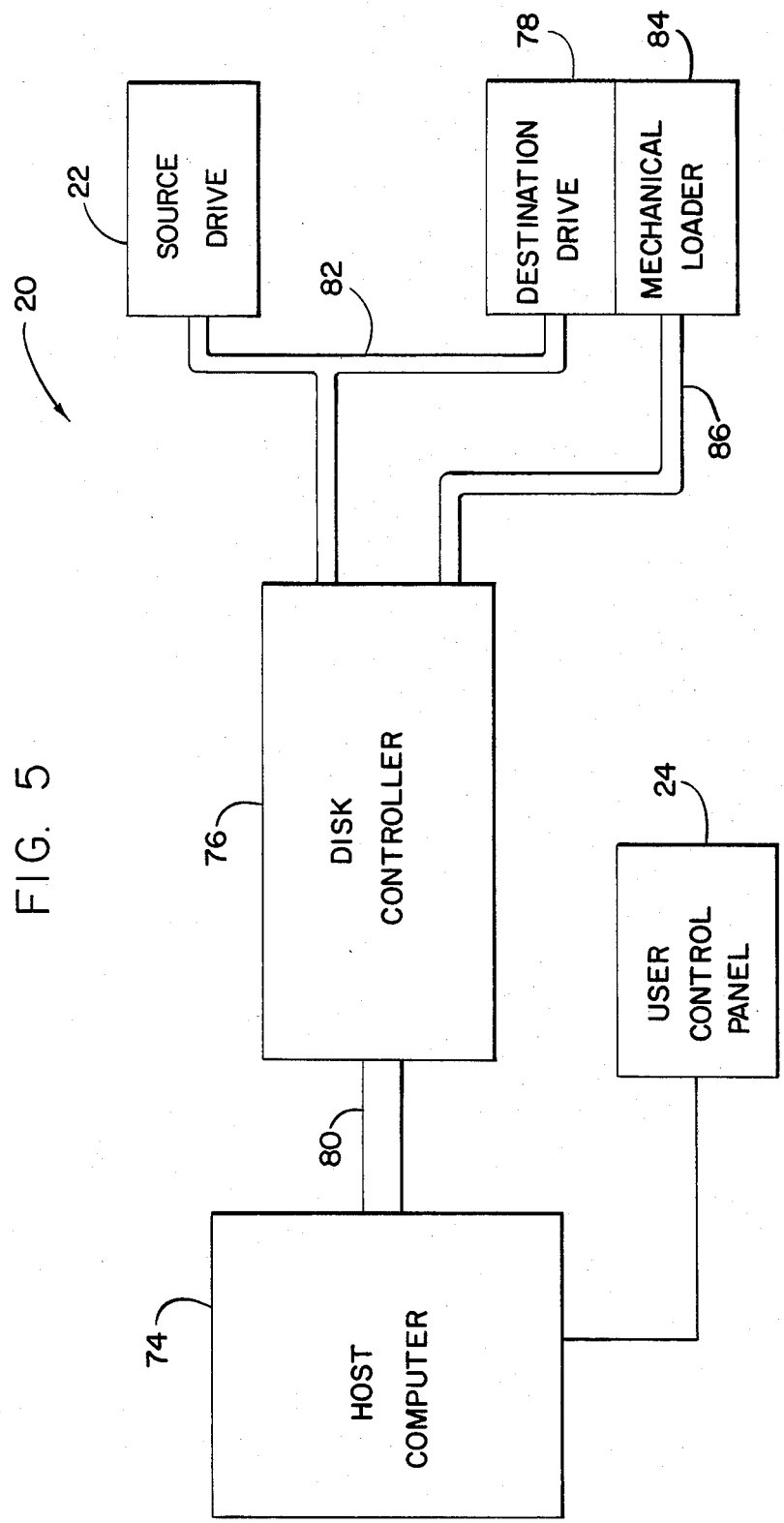
FIG. 5 is a block diagram of a floppy disk copying machine showing the selectable format disk controller.

Referring next to FIG. 5, the disk copier machine 20 includes a host computer 74 which is controlled in operation by the user control panel 24. A source disk drive 22 is connected through the disk controller 76 to the host computer 74. A destination disk drive 78 is connected through the disk controller 76 to the host computer 74. The function of the disk copier machine 20 is to transfer data stored on a source disk mounted in the source disk drive 22 to a destination disk stored in the disk drive 78. The host computer 74 is connected to the disk controller 76 through a bus 80 so that data and commands may be passed back and forth between the computer 74 and the controller 76. A bus 82 is connected between the disk controller 76 and the disk drives 22 and 78. The source and destination disk drives 22 and 78, respectively, are constructed so that they may be operated from the same bus 82 in parallel. A mechanical loader 84 is connected to the disk controller 76 through a bus 86 so that the controller 76 controls the operation of the loader 84. The mechanical loader 84 operates in conjunction with the destination disk drive 78 in order to automatically feed floppy disks into and out of the destination drive 78 and in order to sort the floppy disks between the bins 28 and 30 shown in FIG. 1.

Figure 6A:
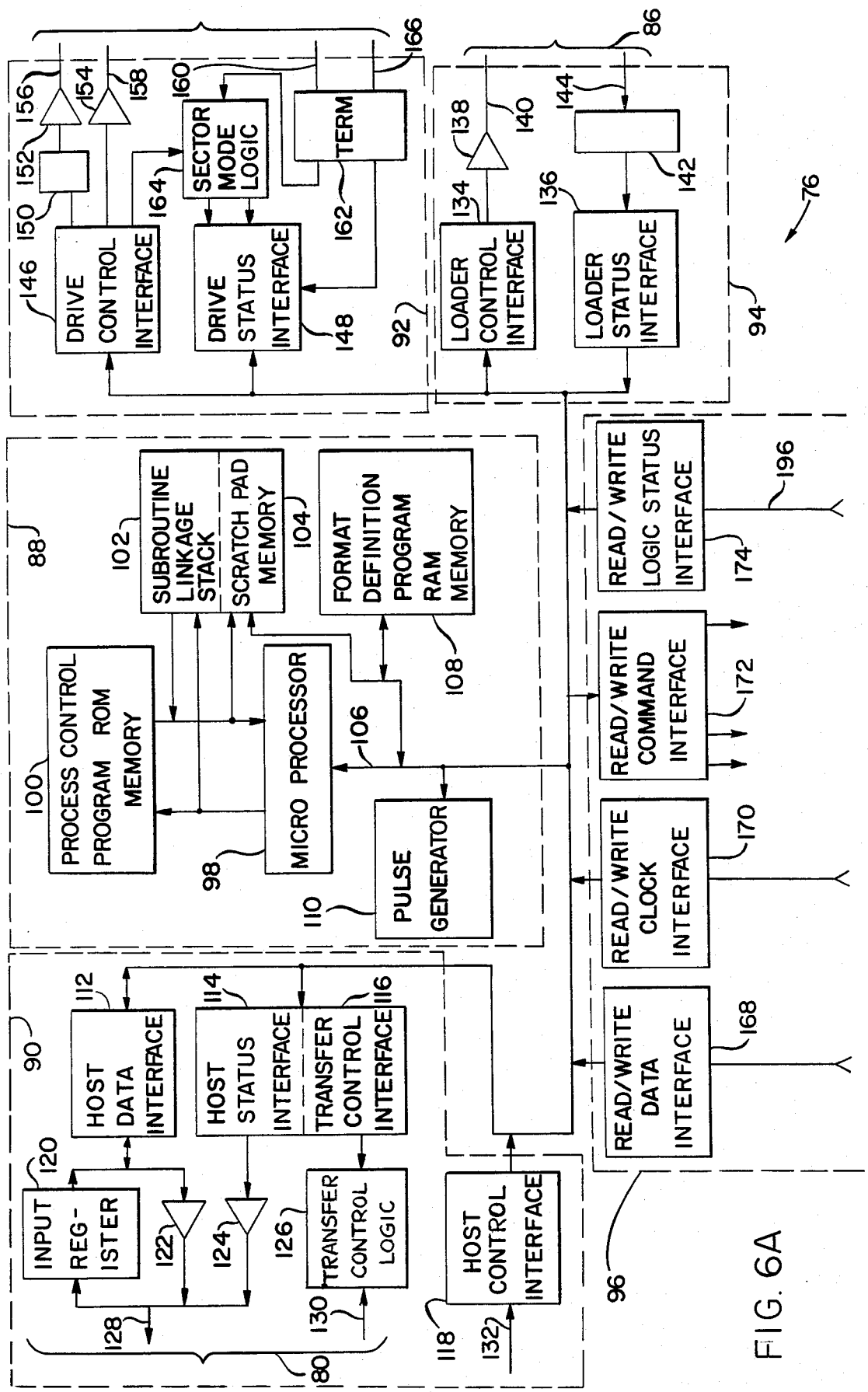
FIGS. 6A and 6B are a block diagram of the selectable format disk drive controller.
Figure 6B:
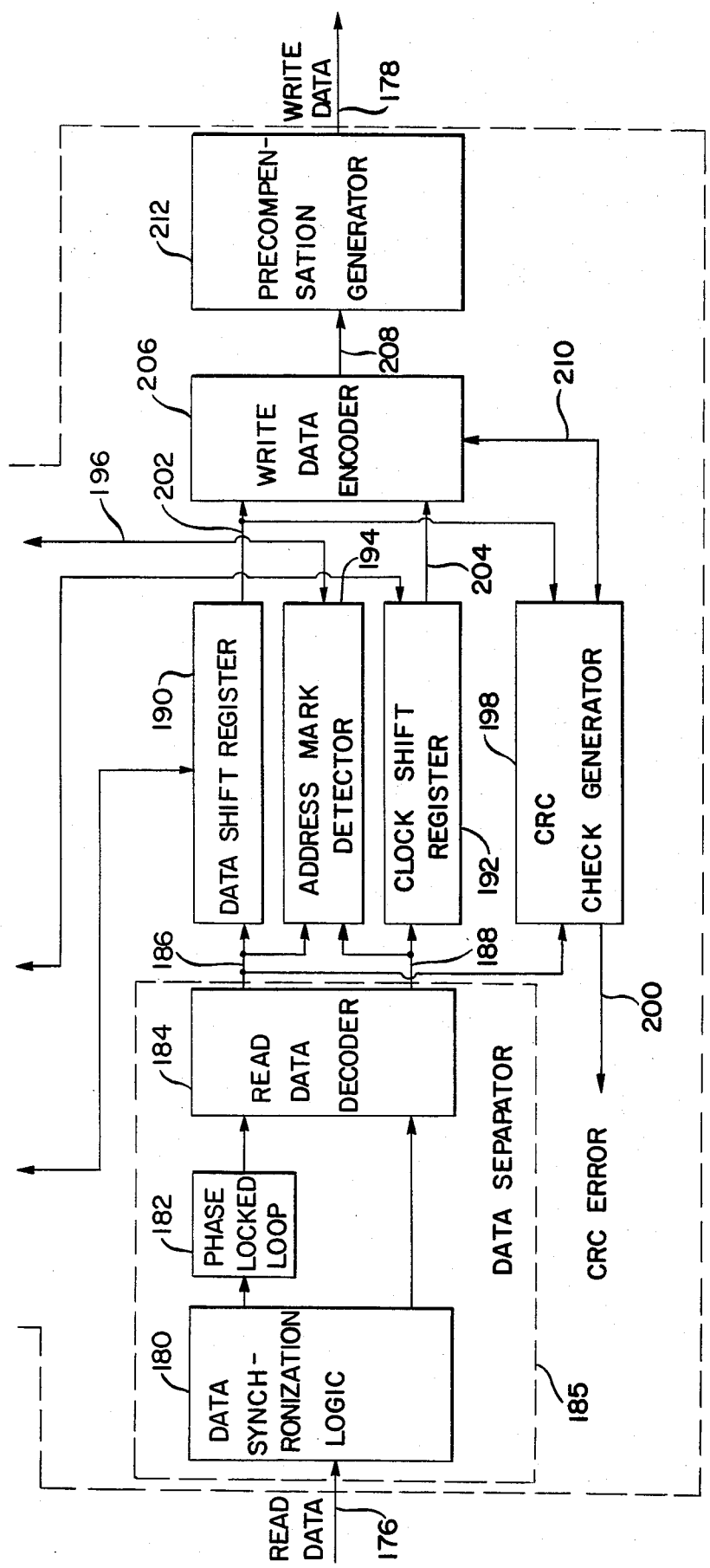

Referring next to FIGS. 6A and 6B, the disk controller 76 includes processor logic 88, a host interface 90, drive control circuitry 92, loader control circuitry 94, and drive read-write data logic 96. The processor logic 88 includes a microprocessor 98 which preferably is a standard, commercially available type 8X300, 16 bit microprocessor available from Signetics Corporation of Santa Clara, Calif. U.S.A. The microprocessor 98 is used to control the internal operation of the disk controller 76. The processor 98 is connected to a read only memory 100 which has a 2K by 24 bit arrangement for storing the process control program. The most significant 16 bits of each 24 bit word stored inside the memory 100 are used as instructions for execution by the microprocessor 98. The least significant 8 bits of each 24 bit word stored in the memory 100 are used by a subroutine linkage stack 102 and scratch pad memory 104 which are also connected to the microprocessor 98. The most significant 2 bits of the least significant 8 bits of each word stored in the memory 100 are used by the subroutine linkage stack 102. The least significant 6 bits of each word stored in the memory 100 are used by the scratch pad memory 104. The function of the subroutine linkage stack 102 is to allow subroutine calls to be executed by the microprocessor 98 and returns to be made from the subrountine calls by means of having the stack 102 store the return address for the subroutine call. The use of a subroutine linkage stack 102 improves the speed performance of the microprocessor 98 in making and returning from subroutine calls. The scratch pad memory 104 is connected to the microprocessor 98 as a high speed work space. The microprocessor 98 is connected to an interface vector bus 106 which allows the microprocessor 98 to be interfaced to a wide variety of external devices.

The scratch pad memory 104 is connected to the interface bus 106 so that data may be passed back and forth between the microprocessor 98 and the memory 104 through the bus 106. A random access memory 108 has a 1K by an 8 bit format and is connected to the microprocessor 98 through the interface bus 106. The purpose of the memory 108 is to receive a format definition program from the host computer 74 (see FIG. 5) and to provide the format definition program to the microprocessor 98 through the interface bus 106. A pulse generator 110 is controlled by the microprocessor 98 through the interface bus 106, and functions to provide timing pulses for use inside the controller 76 in order to control the timing of the transferring of data to and from the controller 76.

The host interface 90 provides an interface between the processor logic 88 and the host computer 74. The host interface 90 includes a host data interface 112, host status interface 114, transfer control interface 116, and host control interface 118, all of which are connected to the interface bus 106. An input register 120 and output buffer 122 are connected between the host data interface 112 and a bidirectional data bus 128 which is a part of the bus 80 connecting the controller 76 to the host computer 74. An output buffer 124 is connected between the host status interface 114 and the data bus 128. The data bus 128 carries 8 bit digital data which may include commands, the contents of a format definition program, or data to be stored on the destination disk drive 78. The data bus 128 may also include disk data read from the source drive 22, or status information transferred through the interface 114 and buffer 124.

Transfer control logic 126 is connected to the transfer control interface 116 in order to provide interrupt information on the bus 130 which serves to inform the host computer 74, through the bus 80, of the status of the controller 76. The control bus 132 portion of the bus 80 is connected to the host control interface 118 in order to inform the controller 76 of the status of the host computer 74.

During operation, the host interface 90 allows the format definition program read from the source disk drive 22 to be transferred through the bus 80 to the host computer 74 and returned through the bus 80 for storage in the RAM memory 108. After the format definition program has been stored in the RAM memory 108, data read from the source disk in the source disk drive 22 is transferred to the host computer 74 through the bus 80 and returned through the bus 80 for recording on the destination disk drive 78.

The loader control 94 serves to connect the processor logic 88 with the mechanical loader 84 (see FIG. 5) through the bus 86. The loader control 94 includes a loader control interface 134 and a loader status interface 136 which serve as output and input interfaces, respectively, to the loader 84. An output buffer 138 is connected between the loader control interface 134 and the control lines 140 of the bus 86 so that output command signals may be sent from the controller 76 to the mechanical loader 84 in order to control the operation of the loader 84 in the feeding and sorting of floppy diskettes through the destination disk drive 78. An input register 142 is connected between the loader status interface 136 and the status lines 144 of the bus 86 so that the controller 76 is informed of the status of the mechanical loader 84, such as whether the destination drive 78 is open or closed, whether the drive 78 contains a diskette, and whether a supply of diskettes is available in the hopper 26 for use by the disk drive 78.

The drive control circuitry 92 includes a drive control interface 146 and drive status interface 148 which are connected to the microprocessor 98 through the interface bus 106. The drive control interface 146 is connected to the decoder 150 and buffers 152 and 154 to provide signals to the disk drives 22 and 78 through the select lines 156 and control lines 158 of the bus 82. The select lines 156 are connected to the disk drives 22 and 78 and provide information to the drives 22 and 78 to indicate which of the disk drives is to transmit or receive data with the controller 76. The control lines 158 are connected to the disk drives 22 and 78 in order to control the timing of data transfers to and from the disk drives 22 and 78.

The index lines 160 of the bus 82 are connected to the drive status interface 148 through an input register 162 and sector mode logic circuitry 164. The index lines 160 present signals corresponding to the detection of the sector holes 34 (see FIG. 3). Operation of the sector mode logic 164 is controlled by an output from the drive control interface 146 so that the beginning of each track and beginning of each sector are independently signaled to the drive status interface 148 by the sector mode logic circuitry 164. Signals representing the status of the disk drives 22 and 78 are presented from the status lines 166 of the bus 82, through the input register 162 and to the drive status interface 148.

The disk drive read-write data logic 96 includes a read-write data interface 168, a read-write clock interface 170, a read-write command interface 172, and a read-write logic status interface 174, all of which are connected to the microprocessor 98 through the interface bus 106. The read data line 176 and write data line 178 are parts of the bus 82 which are connected to the recording/reproducing magnetic heads of the disk drives 22 and 78, as selected by the select lines 156. Signals which are read from the selected disk drive (either drive 22 or drive 78) appear on the line 176. Signals which are to be written onto the drive 22 or drive 78 (as chosen by the select lines 156) appear on the line 178. Therefore, the drive read-write data logic 96 may be used for reading from or writing to either the source drive 22 or the destination drive 78. The data interface 168 and clock interface 170 are bidirectional interfaces which are used for handling the data information and clock information, respectively, for either reading or writing on either of the disk drives 22 or 78. The command interface 172 controls the operation of the circuitry inside the drive read-write data logic 96 in order to control operations during both reading and writing operations. The logic status interface 174 detects the status of the circuitry of the drive read-write data logic 96 during both reading and writing operations. For example, status interface 174 is used to detect whether or not the controller 76 has attained synchronization with incoming signals read from a disk drive, whether the controller 76 is in the process of detecting an address mark read from a disk drive, or whether the controller 76 has detected an address mark coming from a disk drive. The status interface 174 is used by the microprocessor 98 in order to detect the different phases of operation of the read-write data logic 96.

During reading operations in which signals are read from a disk drive, the data synchronization logic 180 is used in order to synchronize an incoming signal on the lines 176 with an internal clock of the controller 76. The phase locked loop 182 is used to track the incoming frequency of the data signals on the line 176. The read data decoder 184 is connected to the phase locked loop 182 and data synchronization logic 180 in order to form a data separator 185 which separates the signal presented on the line 176 into a data signal output 186 and a clock signal output 188. The command interface 172 is connected to the data separator 185 so that the separator 185 may be restarted in order to become synchronized when a new identification field or data field is to be read. The data output 186 is connected to a data shift register 190 which accumulates an 8-bit byte which is presented to the interface 168 for transmission to the microprocessor 98. Similarly, the clock output 188 is connected to a clock shift register 192 which accumulates an 8-bit byte which is presented through the interface 170 to the microprocessor 98. An address mark detector 194 is connected to both the data output line 186 and clock output line 188 in order to produce an output on the address mark detector line 196 which is connected to the status interface 174.

The data synchronization logic 180 operates under the control of the command interface 172 so that when synchronization bytes are to be detected (see synchronization field 46 in FIG. 4) in accordance with the format definition program stored in the memory 108, the microprocessor 98 actuates the interface 172 to enable operation of the synchronization logic 180. Similarly, the format definition program in memory 108 is used by the microprocessor 98 in order to actuate the command interface 172 to control the data decoder 184 in order to accommodate the particular encoding scheme (such as frequency modulation or modified frequency modulation) used in the disk from which the signals on the line 176 are received. The address mark detector 194 is used in order to detect characteristic address marks (see address mark 50 in FIG. 4) and operates under the control of the microprocessor 98, through the command interface 172 which specifies the type of address mark to be detected in accordance with the format definition program in memory 108.

A cyclic redundancy character check generator 198 is connected to the data output line 186 in order to detect a CRC character (see the CRC field 60 in FIG. 4) and verifies that a correct CRC has been read from the incoming signals on line 176 by producing an indication on the line 200 which is connected to the microprocessor 98 through the status interface 174. The CRC check generator 198 operates in accordance with the format definition program in the memory 108.

During writing operations, the command interface 172 causes the data shift register 190 and clock shift register 192 to accept information from the data interface 168 and clock interface 170, respectively, and present the data on the lines 202 and 204, respectively to the write data encoder 206. The write data encoder operates under the control of the microprocessor 98 through the command interface 172 to produce an output signal on the line 208 in accordance with the particular encoding scheme specified by the format definition program in the memory 108. The CRC check generator 198 is also connected to the data input line 202 and provides a CRC signal to the write data encoder 206 over the line 210 so that the encoder 206 will produce a CRC character on the line 208 when instructed to do so by the microprocessor 98 through the command interface 172 in accordance with the format definition program in the memory 108. A precompensation generator 212 is connected between the line 208 and the line 178 in order to apply the commercially standard precompensation required for high density digital recordings on magnetic floppy diskettes. The precompensation generator 212 operates in accordance with the format definition program in the memory 108.

Referring next to FIG. 7, the format definition program includes a sequence of steps in a format definition segment which defines the arrangement, allocation, and meaning of bytes in a disk sector. Each of the format segment steps shown in FIG. 7 is denoted by a encircled number on the right side of the listing which is provided for clarity in the drawings in order to allow explanation of the individual steps. The thirteen format definition segment steps shown in FIG. 7 correspond to the sector arrangement shown in FIG. 4 which reflects the arrangement which is commonly known as "IBM compatible". Three pointers are labeled for clarity by encircled characters on the left side of the listing in FIG. 7. The three pointers, a, b and c, are indirect addressing pointers obtained from a pointer table (not shown) and which are used for accessing portions of the format definition program. The pointer labeled a references the format segment step labeled 2, the pointer labeled b references the segment step labeled 8, and the pointer labeled c references the segment step labeled 9.

The format definition program listing shown in FIG. 7 corresponds to the source code version (prior to an assembly operation) of a portion of the format definition program which is to be stored in the RAM memory 108. The format definition segment steps labeled 1-13 correspond to the sector fields labeled 46, 50, 52, 54, 56, 58, 60, 62, 64, 66, 68, 70, and 72 in FIG. 4.

Figure 8:
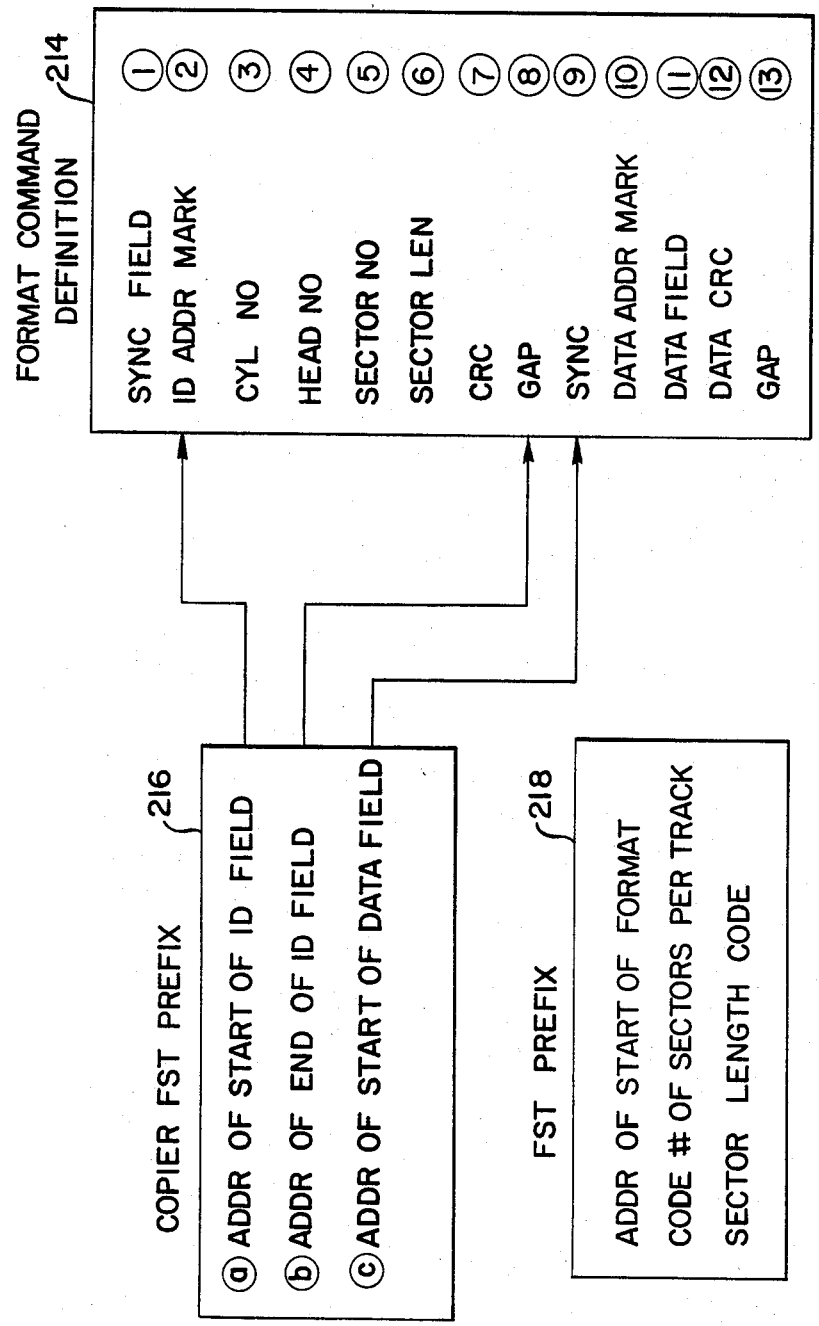
FIG. 8 shows the relationship in a typical format definition program between indirect addressing pointer tables and the format definition segment.

Referring next to FIG. 8, the format definition segment 214 presents a generalized arrangement similar to that shown in FIG. 7 and having similarly numbered steps. A pair of pointer tables 216 and 218 are also included in the definition program and provide indirect address referencing for the format segment 214. The pointer tables 216 and 218 are referenced indirectly by the microprocessor 98 which executes the process control program stored in the memory 100. When an entry in either table 216 or 218 is referenced by the microprocessor 98, the corresponding step in the segment 214 is accessed and used by the microprocessor 98.

Figure 9:
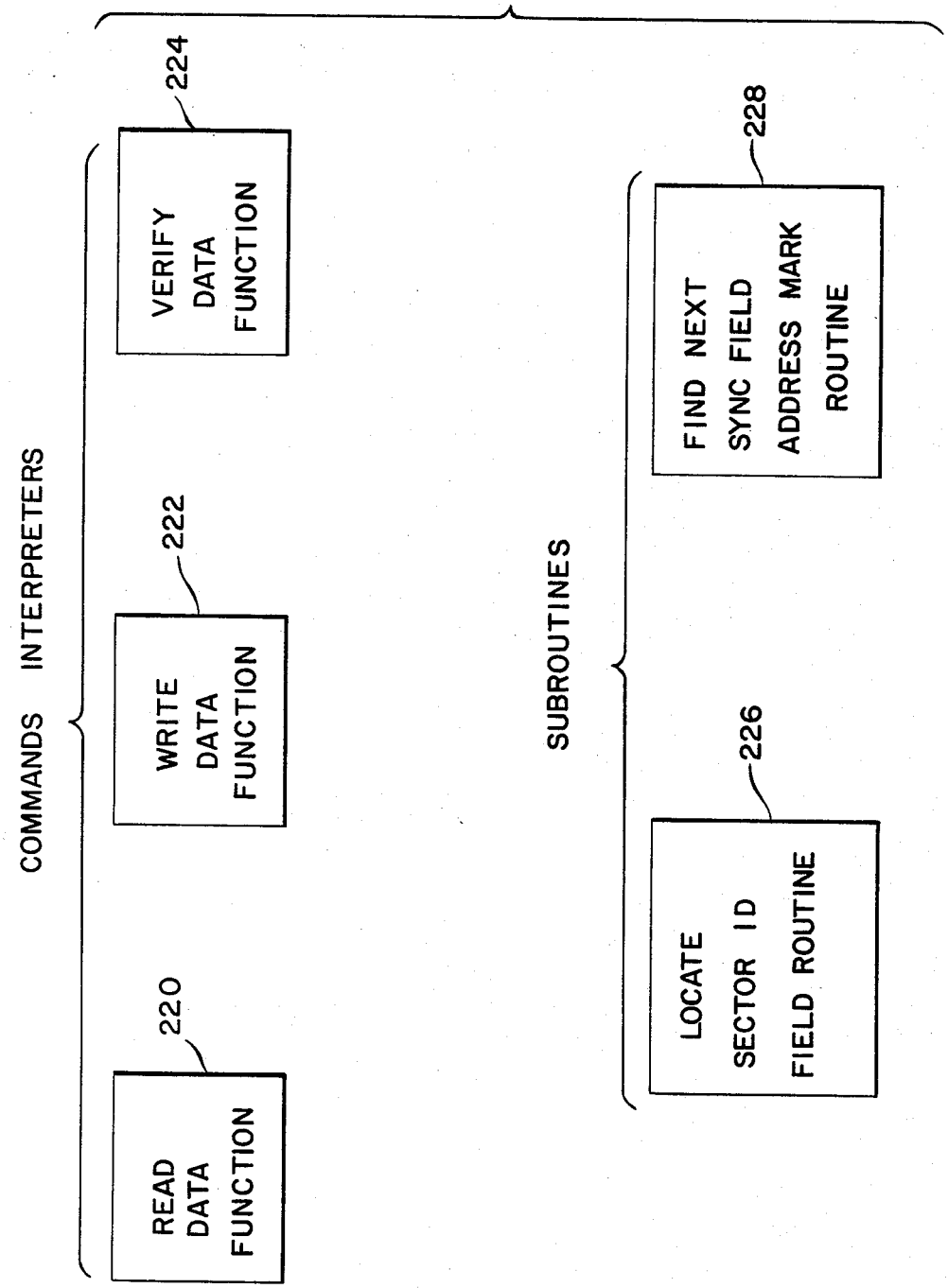
FIG. 9 is a block diagram showing the command interpreters and subroutines of the process control program.

Referring next to FIG. 9, the process control program includes command interpreters and subroutines which are permanently stored in the ROM memory 100. The command interpreters and subroutines of the process control program are format independent and operate in cooperation with the format definition program stored in the memory 108 in order to control the operation of the controller 76 so that the disk copier machine 20 may be used to make copies of floppy diskettes in a variety of disk formats. The process control program also includes command interpreters not shown in FIG. 9 which allow disk initialization to be performed and the initialization performance to be verified.

The process control program includes a read data function 220, write data function 222 and verify data function 224 which act as command interpreters to interpret the commands received by the microprocessor 98, through the host interface 90 from the host computer 74. The process control program also includes a locate sector identification field routine 226 and find next synchronization field/address mark routine 228 which are subroutines which may be called by the command interpreters 220, 222, and 224.

Figure 10:
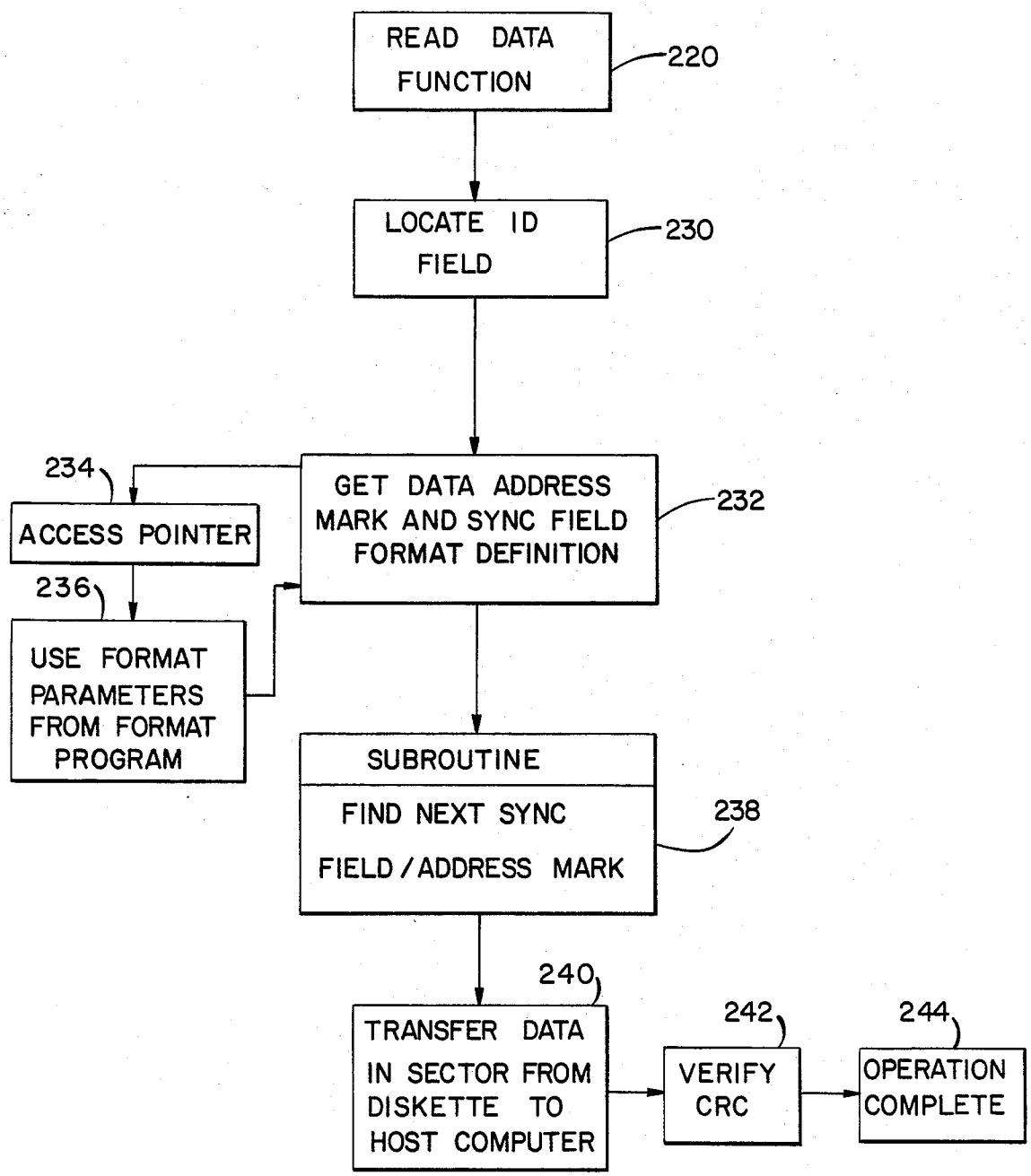
FIG. 10 is a flow chart of the read data function command interpreter.

Referring next to FIG. 10, the operations shown in blocks beneath the block 220 labeled "read data function" are performed by the processor 98 after a "read" command is received by the controller 76 from the host computer 74. When the "read" command is received by the controller 76, the operation in the block 230 is performed in order to perform the steps of the locate sector ID field subroutine 226 further described with reference to FIG. 13. After the operation of block 230 has been performed, an operation is performed in block 232 to get the data address mark and synchronization field location from the format definition program by performing the operation in block 234 to access the appropriate pointer from the tables 216 and 218, and by performing the operation in block 236 in order to use the pointer just obtained from the tables 216 and 218 in order to reference the appropriate instruction step in the format definition segment 214. After the operations in blocks 234 and 236 have been used by the processor 98 in order to perform format specific functions, the operation in block 238 causes the subroutine 228 to be executed as is further described with reference to FIG. 14. After the operation in block 238 has been performed, the read data function 220 allows execution of the operation in block 240 in order to transfer data from the sector just located so that the data is transferred from the diskette to the host computer 74. After the data has been transferred by the block 240, the block 242 is executed in order to verify that the cyclic redundancy character detected by the generator 198 is correct. If block 242 detects that the check character was correct, the read data operation is completed in the block 244 and the processor 98 will respond to further commands from the host computer 74.

Figure 11:
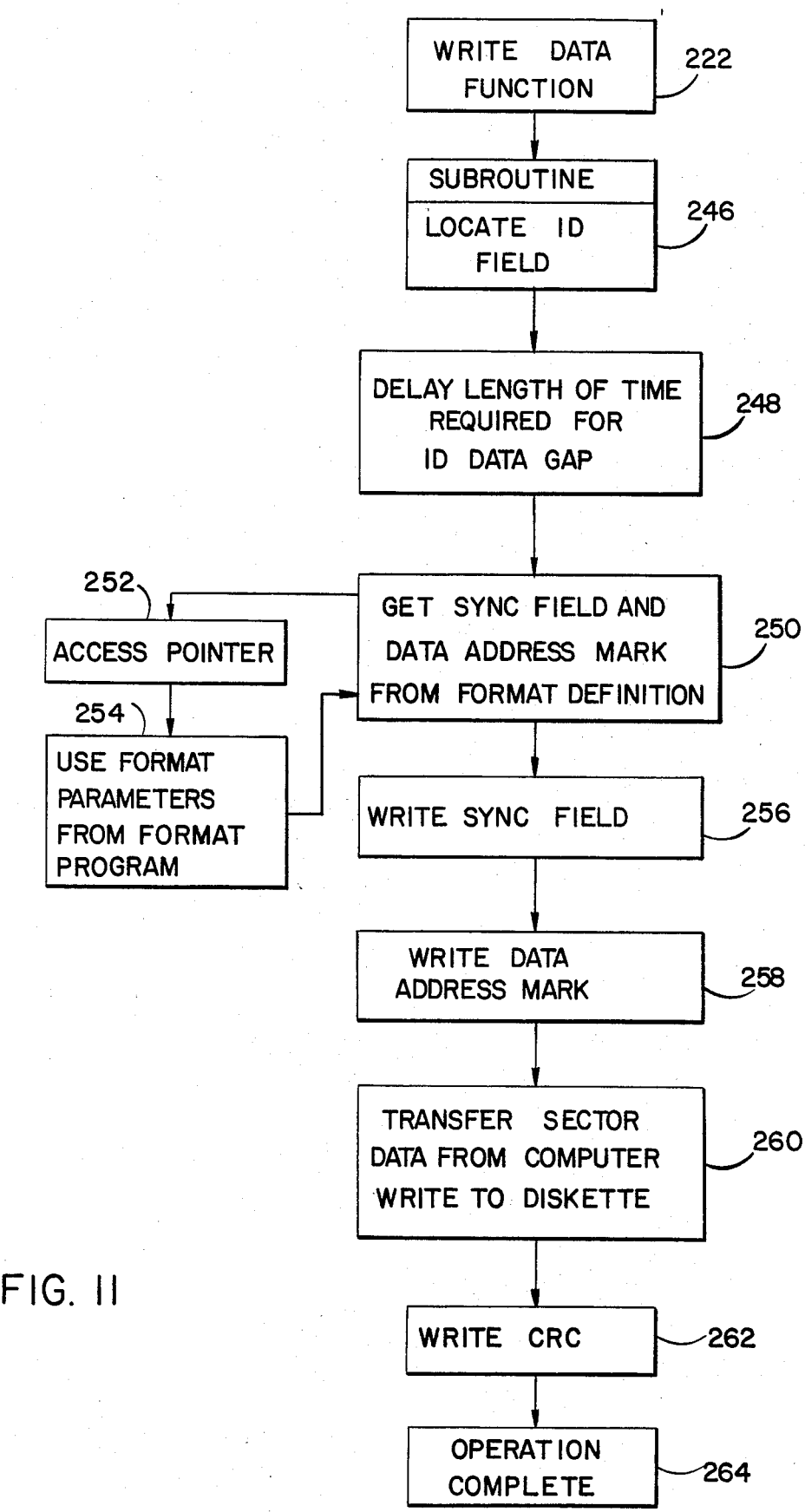
FIG. 11 is a flow chart of the write data function command interpreter.

Referring next to FIG. 11, the write data function begins at block 222 and proceeds by executing block 246 which calls the locate identification field subroutine 226 that is further described with reference to FIG. 13. After a return is made from the subroutine called at block 246, the block 248 is executed in order to wait for the amount of time required for the gap (see the gap field 62 of FIG. 4) between the completion of the identification field in the diskette sector and the beginning of the data synchronization field in the diskette sector. After the time determined by the block 248 has been completed, the block 250 is executed in order to get the synchronization field and data address mark for the sector from the format definition program stored in the memory 108. The steps shown in blocks 252 and 254 perform functions analogous to those described with reference to blocks 234 and 236 in using the program steps stored in the memory 108 in order to adapt to the particular disk format in use. After the particular format definition program steps specified in the block 250 have been used, the block 256 is executed in order to write the data synchronization field (see the synchronization field 64 shown in FIG. 4). After the instruction block 256 has been executed, the instruction block 258 is executed in order to write a data address mark on the diskette corresponding to the address mark 66 shown in FIG. 4. After the block 258 has been performed, the block 260 is performed in order to transfer sector data from the host computer 74 to the diskette in the destination disk drive 78, wherein the data transferred is placed in a field corresponding to the data field 68 shown in FIG. 4. After the writing operation specified by block 260 has been completed, a cyclic redundancy character (similar to the CRC field 70 shown in FIG. 4) is written by the block 262, and the write data function is completed in block 264.

Figure 12:
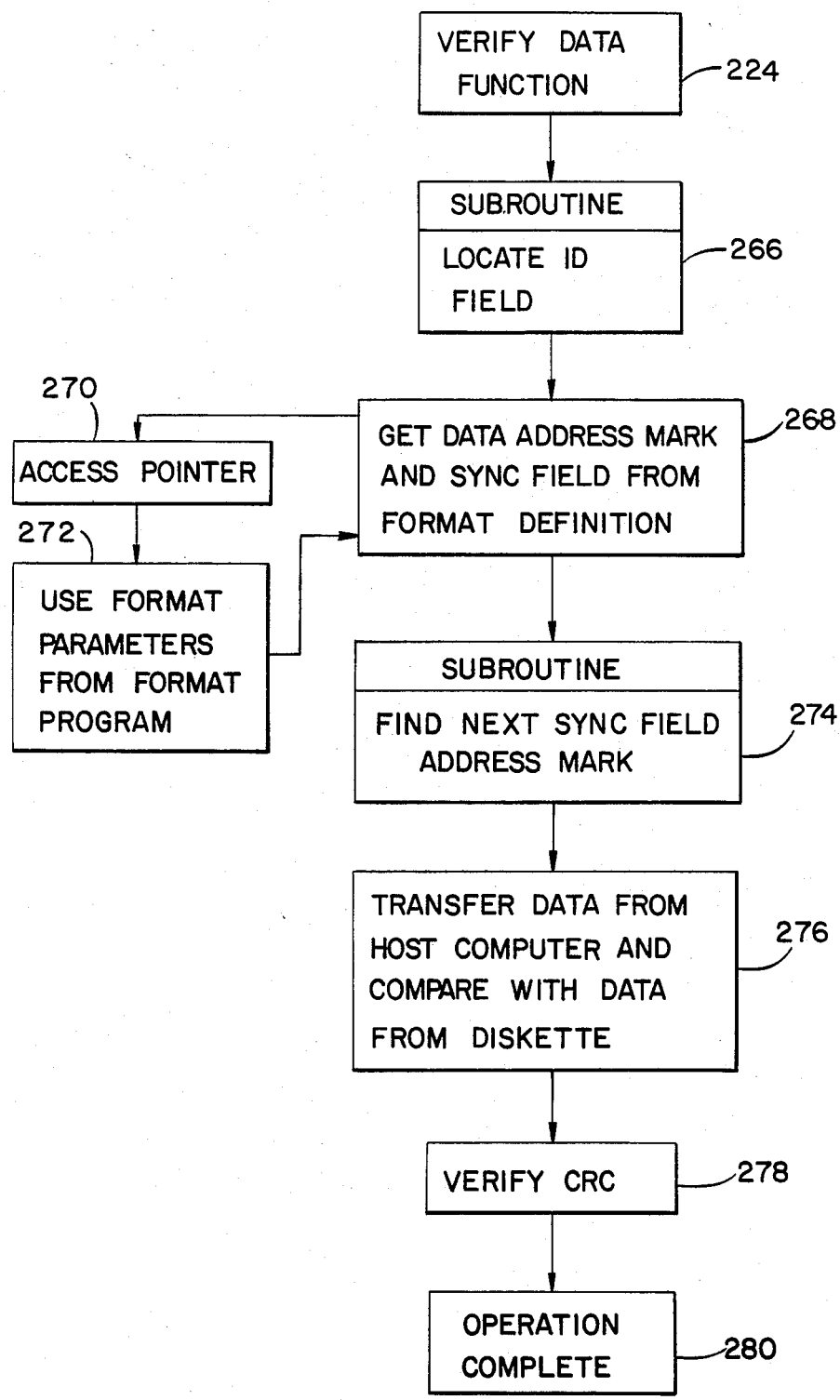
FIG. 12 is a flow chart of the verify data function command interpreter.

Referring next to FIG. 12, the verify data function 224 proceeds by calling the subroutine 226 in the block 266 in order to locate the sector identification field. Next, the block 268 is executed in order to get the data address mark and synchronization field through the use of the format definition program by execution of the blocks 270 and 272 which correspond to the blocks 234 and 236, described above. After execution of the block 268 has been completed, the block 274 is executed in order to call the subroutine 228 which is described further with reference to FIG. 14. After return from the subroutine called in the block 274, the block 276 is executed in order to transfer data from the host computer 74 and compare with data transferred from the disk in the destination drive 78 in order to verify that the data recorded, and the data which was supposed to have been recorded are the same. The verification comparison is performed by the microprocessor 98 which controls the loader control 94 (see FIG. 6) so that the disk copying machine 20 (see FIG. 1) may be caused to select between the bins 28 and 30 for diskettes which have failed or passed, respectively, the verification test performed in the block 276. After the verification test in block 276 has been performed, the block 278 is performed in order to verify that the cyclic redundancy check character is correct on the diskette in the destination disk drive 78. After performance of the block 278, the verification function is completed in the block 280.

Figure 13:
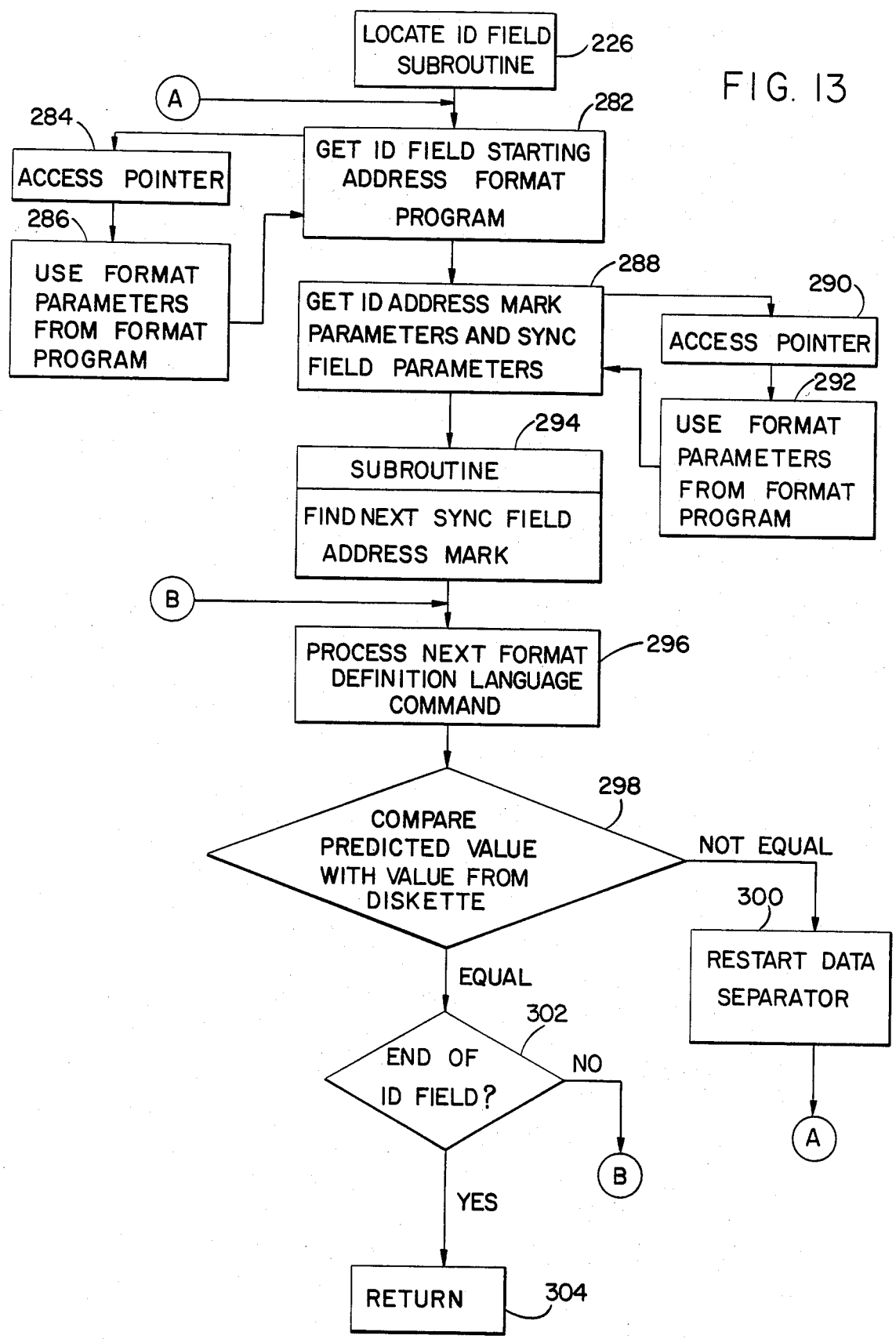
FIG. 13 is a flow chart of the locate identification field subroutine.

Referring next to FIG. 13, the locate ID field subroutine 226 begins at block 282 which gets the identification fields starting address from the format definition program by executing the blocks 284 and 286 to perform the kind of indirect addressing of the format definition program which was described above with reference to blocks 234 and 236. Next, the block 288 is executed in order to get the identification field address mark parameters and synchronization field parameters from the format definition program through the use of the blocks 290 and 292 which function the same as the blocks 234 and 236 described above with reference to FIG. 10. After execution of block 288, block 294 is executed in order to call the subroutine find next synchronization field/address mark 228 which is further described with reference to FIG. 14. After return from the subroutine in block 294, the block 296 is executed in order to cause the excecution of the next sequential format definition program step stored in the RAM memory 108. The results of the execution of the block 296 are tested in the block 298 which compares a predicted value (i.e., the sector identification information provided by the host computer 74 to locate a particular cylinder number, head number, and sector number) with the value read from the diskette. The test shown in block 298 is performed by the processor 98 in order to compare the desired sector identification information received from the host computer 74 with the sector information that has just been read from the diskette. If the value read from the diskette does not match the predicted value in the test 298, the block 300 is executed in order to restart the data separator 185 and begin looking for the next sector identification field on the the diskette by looping back to resume operation of the subroutine 226 with the block 282. If the desired diskette identification field matches up with the identification field read from the diskette in the test 298, the test 302 is performed in order to determine if the end of the identification field has been reached. If the test 302 determines that the end of the identification field has not been reached for the sector, execution of the subroutine 226 resumes with execution of the step 296. If the test 302 determines that the end of the identification field has been reached for the sector, the block 304 is executed in order to return from the subroutine 226 to the command interpreter (either read data function 220, write data function 222 or verify data function 224) at the position immediately following that from which the subroutine call was initiated.

Figure 14:
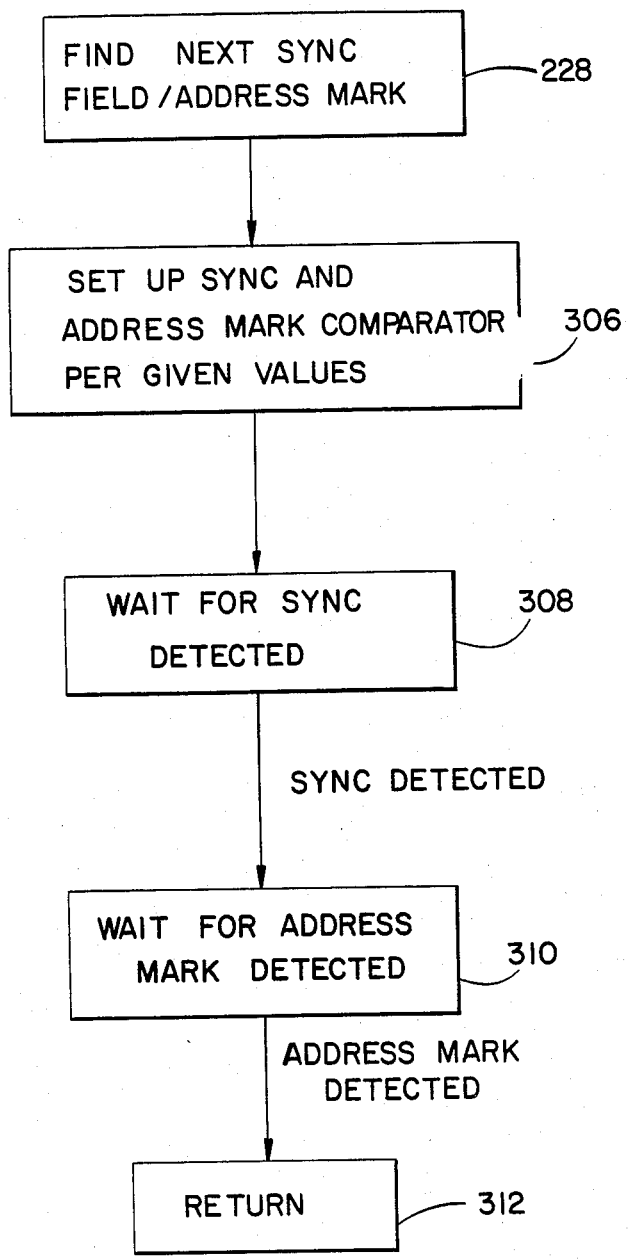
FIG. 14 is a flow chart of the find next synchronization field/address mark subroutine.

Referring next to FIG. 14, the subroutine 228 begins with execution of the block 306 which sets up the data synchronization logic 180 and address mark detector 194 in accordance with the parameters specified in the format definition program stored in memory 108. Execution of the block 306 causes the controller 76 to configure itself to accommodate the particular data encoding scheme and particular form of address marks used in the format of the diskette to be copied. Next, the step 308 acts as a check to suspend operation of the subroutine 228 until such time as a synchronization field (such as the fields 46 and 64 of FIG. 4) has been detected by the synchronization logic 180. Once synchronization has been detected by the block 308, the block 310 is executed in order to suspend operation of the subroutine 228 until such time as the address mark (in accordance with the format specified in block 306) has been detected by the address mark detector 194. After the address mark has been detected in the block 310, the subroutine 228 returns to the calling command interpreter (the read data function 220, write data function 222, or verify data function 224) through the return block 312.

Referring next to FIG. 15, the format definition program listing presented therein is a hexidecimal listing of a typical format definition program for use with this invention.

Also included as a part of this specification are pages of computer printout sheets which form a hexadecimal listing of the object code process control program (labeled FDIC PRODUCT FIRMWARE) and a typical object code format definition program labeled FORMAT DEFINITION LISTING (for an "IBM compatible" format) for use in this invention. The listing is made up of hexadecimal digits representing bytes of the program content, with each two adjacent digits representing a byte. The object code listing is presented in a sequence of rows and columns in which each row is preceded at its left with a four digit row number corresponding to the address of the first byte in the row, and in which te addresses of the bytes in the rows increases from left to right, with adjacent bytes in the same row representing the contents of sequentially adjacent addresses. The addresses of memory contents represented in the object code listing increases from the top to the bottom of the columns.

What is claimed is:

1. A selectable format disk drive controller for controlling the operation of a computer disk drive in reading and writing operations, said controller comprising:
   means for process control program storage for permanently storing a process control program;
   means for format definition program storage for storing a format definition program so that the contents of said format definition program may be changed in order to select the format for use with said disk drive; and
   means for processing connected to both said means for program storage so that steps of said process control program may be executed to use steps of said format definition program in order to control the operation of said disk drive in reading and writing operations.

2. The selectable format disk drive controller of claim 1 wherein said means for process control program storage comprises read only memory having a process control program encoded therein, said means for format definition program storage comprises random access memory, and said means for processing comprises a digital computer processor.

3. A computer disk copying apparatus for copying stored digital data onto a destination computer disk in a predefined format, said disk copying apparatus comprising:
   a host computer for reading the digital data from a data storage source, and for defining a format definition program for the format in which the digital data is to be written on the destination computer disk;
   a destination disk drive into which said destination computer disk may be mounted so that said digital data may be transferred to said destination disk; and
   a selectable format disk controller, connected between said host computer and said disk drive, for executing the format definition program defined by said host computer so that said disk drive is operated by said controller to place said digital data on said destination disk in the format defined by said host computer.

4. The computer disk copying apparatus of claim 3 wherein said controller executes said format definition program by accessing an instruction pointer table in said format definition program which, in turn, references corresponding format specification instructions in said format definition program.

5. A disk controller for controlling the operation of a computer disk drive and for responding to commands issued by a host computer so that data from the host computer may be written on and read from the disk drive, wherein said controller comprises:
   a format decoder connected to said host computer for receiving commands therefrom, and connected to said disk drive for controlling the operation thereof in response to said commands received from said host computer;
   a format definition memory connected to said host computer for receiving format definition program steps therefrom, and connected to said format decoder so that said format definition program steps may be executed by said format decoder to control the format of data written on and read from said disk drive; and
   a process memory having process control steps stored therein, and connected to said format decoder so that said process control steps may be executed thereby in order to respond to said host computer commands, and to control the sequence of execution of said format definition program steps.

6. The disk controller of claim 5 wherein said format definition memory comprises:
   a format definition segment containing format specification instructions for said disk drive; and
   an instruction pointer table containing indirect address references to said format definition segment so that when said table is accessed by said process control steps, format specification instructions corresponding to the accessed pointer table entry will be executed by said format decoder in order to control the operation of said disk drive.

7. A method of copying computer disks in a disk copier machine having a selectable format disk drive controller connected to a source disk drive and to a destination disk drive, said method comprising the steps of:
   mounting a format definition disk in said source disk drive and transferring information from said format definition disk to said selectable format disk drive controller in order to configure said selectable format disk drive controller for the particular disk format to be used;
   removing said format definition disk from said source disk drive;
   mounting a source disk in said source disk drive;
   mounting a destination disk in said destination disk drive; and
   transferring information from said source disk to said destination disk.

8. A method of copying information onto computer disks in a disk copier machine having a selectable format disk drive controller connected to a destination disk drive, said method comprising the steps of:
   transferring a format definition program to said controller in order to configure said controller for the particular disk format to be used;
   mounting a destination disk in said destination disk drive; and
   transferring said information to said destination disk in the particular disk format.

* * * * *